United States Patent
Kraus et al.

(10) Patent No.: US 7,121,674 B2
(45) Date of Patent: Oct. 17, 2006

(54) ILLUMINABLE DISPLAY

(75) Inventors: Karen M. Kraus, Farmington Hills, MI (US); Robert V. Wilson, II, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 169 days.

(21) Appl. No.: 10/680,903

(22) Filed: Oct. 8, 2003

(65) Prior Publication Data

US 2005/0078485 A1    Apr. 14, 2005

(51) Int. Cl.
    *G01D 11/28*  (2006.01)
(52) U.S. Cl. .................. 362/27; 362/30; 362/84; 362/614; 362/800
(58) Field of Classification Search ................. 362/23, 362/26, 27, 30, 489, 511, 601–634, 551–582; 116/286, 287, 288, 310
    See application file for complete search history.

(56) References Cited

U.S. PATENT DOCUMENTS

| | | | | |
|---|---|---|---|---|
| 2,561,885 A | * | 7/1951 | Prideaux et al. | ............... 40/546 |
| 3,131,670 A | * | 5/1964 | Hardesty | ................... 116/288 |
| 4,559,582 A | * | 12/1985 | Scardilli et al. | ............. 362/23 |
| 5,047,761 A | * | 9/1991 | Sell | ........................ 340/815.42 |
| 5,143,434 A | * | 9/1992 | Ohta et al. | ..................... 362/29 |
| 5,531,181 A | * | 7/1996 | Cookingham | ................ 116/288 |
| 5,911,492 A | * | 6/1999 | Perry et al. | ................... 362/26 |
| 6,025,820 A | | 2/2000 | Salmon et al. | |
| 6,302,551 B1 | * | 10/2001 | Matumoto | .................... 362/27 |
| 6,454,422 B1 | * | 9/2002 | Williams | ..................... 362/23 |
| 6,461,006 B1 | * | 10/2002 | Matumoto | .................... 362/27 |
| 6,502,976 B1 | * | 1/2003 | Bernhard | .................... 362/555 |
| 6,550,953 B1 | | 4/2003 | Ichikawa et al. | |
| 6,848,799 B1 | * | 2/2005 | Kalantar | ...................... 362/23 |

FOREIGN PATENT DOCUMENTS

| | | |
|---|---|---|
| DE | 1 678 456 U | 6/1954 |
| DE | 35 05 734 A1 | 10/1985 |
| DE | 41 10 106 C2 | 10/1991 |
| DE | 694 05 617 T2 | 3/1998 |
| GB | 1 300 057 | 12/1972 |
| JP | 10055148 | 8/1996 |
| JP | 2001221662 | 2/2000 |
| JP | 2002257598 | 3/2001 |

* cited by examiner

*Primary Examiner*—Renee Luebke
*Assistant Examiner*—Gunyoung T. Lee
(74) *Attorney, Agent, or Firm*—Brinks Hofer Gilson & Lione (57) ABSTRACT

An illuminable instrument panel display of an automobile vehicle includes a first plate having a thickness and defining opposed first and second surfaces. Portions of the plate define an outer peripheral edge and an inner peripheral edge that define a central region. Indicia is formed into the plate and adapted to pick up ambient and supplied light. A light source is located within the central region. A support is coupled to the plate so as to support the plate relative to the instrument panel whereby the light source is adapted to illuminate the indicia through the transmission of light through the inner peripheral edge within the thickness of the face plate.

25 Claims, 7 Drawing Sheets

ILLUMINABLE DISPLAY

BACKGROUND

1. Field of the Invention

The present invention generally relates to illuminable displays in automotive vehicles. More specifically, the invention relates to an illuminable display that is edge lit from the center of the display and utilized in an instrument panel of an automotive vehicle.

2. Description of Related Art

Every automotive vehicle includes an instrument panel into which are inset various instruments that either provide information to the occupants of the vehicle or allow the occupants to control the interior environment of vehicle. Instruments of the type that relay information to the occupants include, without limitation, the speedometer, tachometer, fuel gage, engine temperature gage, battery charge gage, drive selection indicator, as well as various service or warning indicators. Examples of environmental controls include the audio and/or navigational system, and the heating, ventilation and air conditioning (HVAC) system.

Traditionally, instruments have been flat displays located within a fixed housing that is inset into the instrument panel. The methods used to light these instruments have kept the display located on a back plane of the instrument. Typically, the lighting of these displays has involved the location of a light source behind the back plane and a translucent portion of the display that allows the light pass therethrough, rendering the markings of the display visible to an occupant of the vehicle. Other lighting methods reflect light or direct light onto the surface of the display that is viewable by the occupant of the vehicle.

Lighting these instruments in an even manner has been a challenge to designers, requiring light compensation passes to be printed on the backside of a graphics appliqué or the engineering of a reflective dish or light pipe. Additionally, these limitations have limited the ability of designers to produce instruments and instrument clusters that are differentiable in the marketplace.

In view of the above it is apparent that there exists a need for a display design that removes the limitations associated with lighting of the display and that frees designers to differentiate instruments and instrument clusters in the marketplace.

SUMMARY

In satisfying the above need, as well as overcoming the enumerated drawbacks and other limitations of the related art, the present invention provides a display, instrument or gage that is edge lit from the center of the display for more evenly distributed light. The display includes a plate having an outer perimeter edge and an inner perimeter edge, the latter being defined by an aperture or depression in the plate. A light source is located generally centrally within the inner perimeter edge, thereby transmitting light into the plate. The outer perimeter edge of the plate may be beveled and polished so as to reflect, back into the plate, a portion or all of the light transmitted from the inner perimeter edge. Cut, etched or molded indicia are formed in one or more of the faces of the plate. The slightly "rough" surfaces of the indicia accordingly pick up the light being transmitted edgewise within the plate and cause the indicia to glow. By forming the indicia directly into the plate, the cost of a separate graphics appliqué is eliminated. Additionally, locating the light source as provided herein eliminates the need for a light pipe or reflector and the costs associated therewith.

A housing or support is provided generally in the center of the plate to hold and support the plate. This support may extend rearward away from the occupant of the vehicle, generally toward the instrument panel itself, so as to space the plate from a back plane of the instrument panel. In doing so, a "floating" appearance to the display is achieved. A motor and movable pointer for an analog gage may also be provided within the housing, along with the light source and its associated circuitry.

Accordingly, in one aspect the present invention includes an illuminable instrument panel display of an automobile vehicle, the display comprising a plate having opposed first and second surfaces and defining a thickness therebetween, portions of said plate define an outer peripheral edge and additional portions define an inner peripheral edge and a central region; indicia are formed into the plate and are adapted to pick up ambient and supplied light from a light source located within said central region; a support is coupled to the plate so as to support the plate relative to the instrument panel; whereby the light source is adapted to illuminate the indicia through the transmission of light through the inner peripheral edge within the thickness of the plate.

Further objects, features and advantages of this invention will become readily apparent to persons skilled in the art after review of the following description, with reference to the drawings and the claims that are appended to and form a part of this specification.

DETAILED DESCRIPTION

Figure 1:
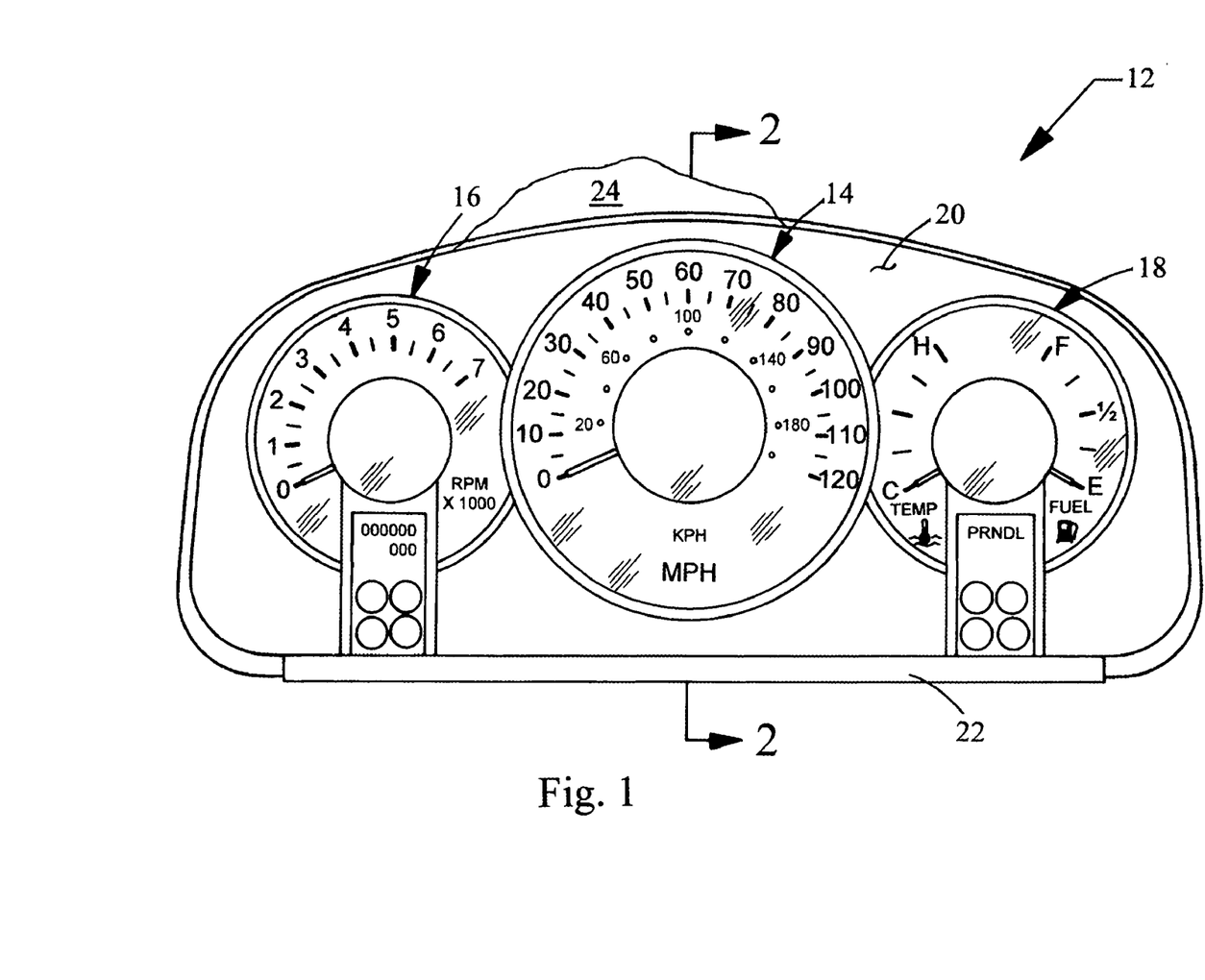
FIG. 1 is a front elevational view of a portion of an instrument panel embodying the principles of the present invention.

Referring now to the drawings, an instrument cluster embodying the principles of the present invention is illustrated in FIG. 1 and generally designated at 12. The instrument cluster 12 is shown as having three illuminable gages or displays (hereinafter "displays"). Of the three displays, the center display 14 representatively illustrates a speedometer, the left display 16 a tachometer and the right display 18 an engine temperature gage and a fuel gage. Each display 14, 16, 18 is mounted via a support to either the back plate 20 or base 22 of the instrument cluster 12. The instrument cluster 12 is itself received on or within an instrument panel 24 of a vehicle, such as an automotive vehicle.

Figure 2:
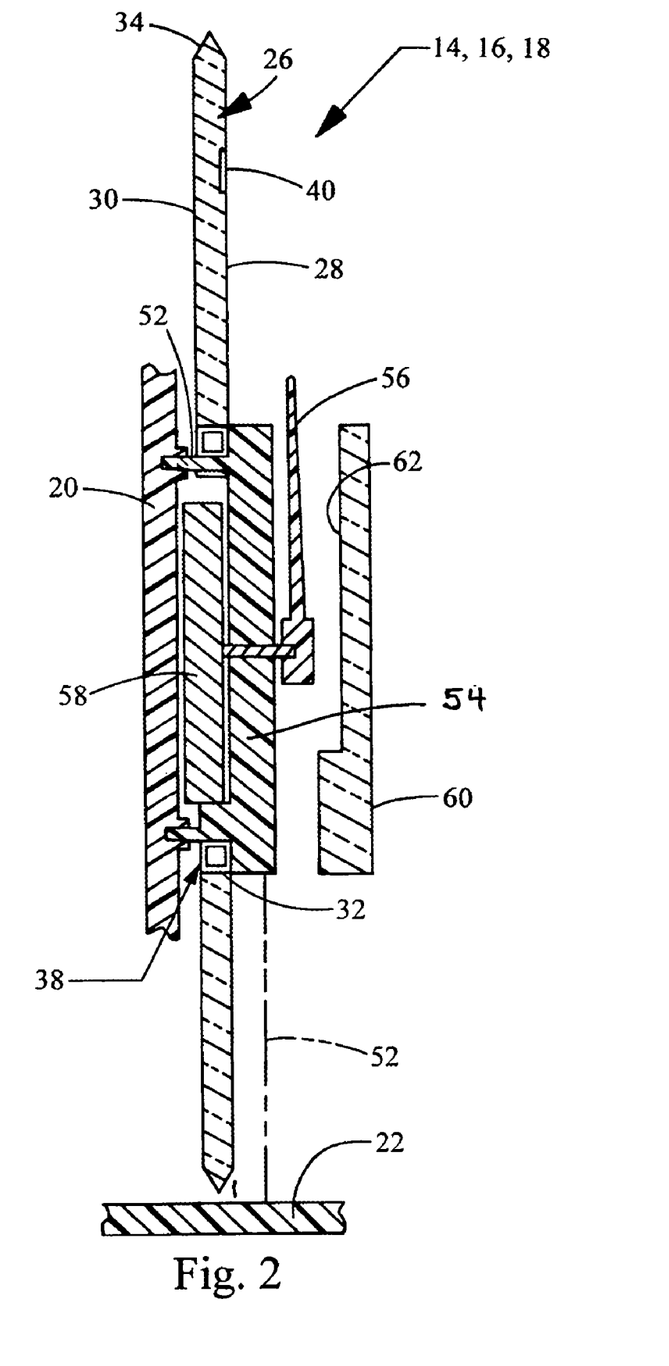
FIG. 2 is a sectional view generally taken along line 2—2 in FIG. 1.

Each display 14, 16, 18 includes a dial or plate 26 of transparent or translucent material and, as such, may be formed of a plastic, or other glass material. The plate 26 is generally planar and includes opposed first and second surfaces 28, 30 that are, respectively, the first and second faces of the plate 26. Additionally, portions of the plate 26 define an inner peripheral edge 32 and other portions define an outer peripheral edge 34. In the embodiment of FIG. 2 the inner peripheral edge 32 is generally formed perpendicular to the first and second surfaces 28, 30, while the outer peripheral edge 34 is beveled, with respect to both the first and second surfaces 28, 30, and polished.

Figure 6:
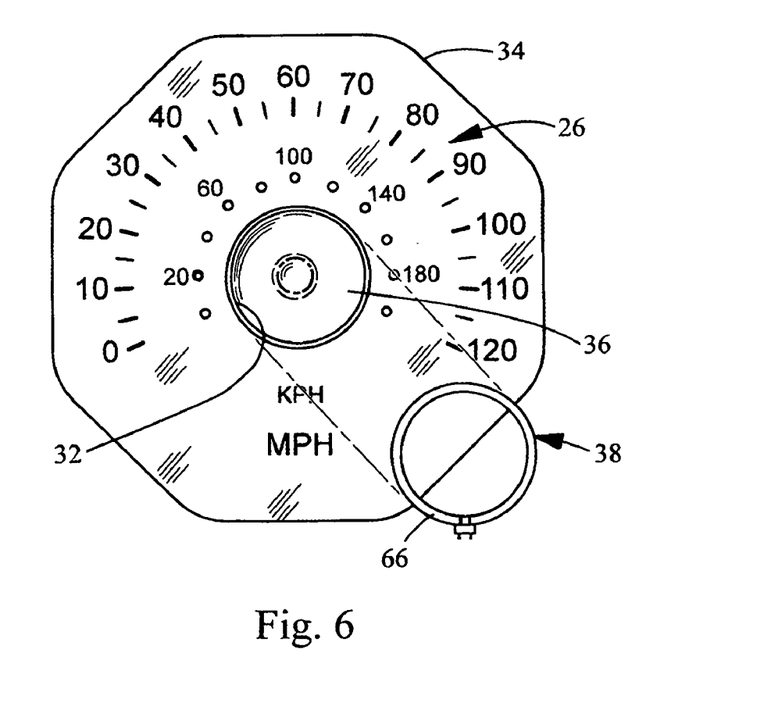

The inner peripheral edge 32 may be defined as an aperture extending completely through the plate 26 or, alternatively and as illustrated in FIG. 6, may be the side edges of a depression 36 formed in the plate 26. Located within the aperture or depression 36 is a light source 38. The light source 38 is positioned so that light emitted by the light source 38 is transmitted through the inner peripheral edge 32 into the plate 26 and directed toward the outer peripheral edge 34. In other words, the plate 26 is center-edge lit. Upon reaching the outer peripheral edge 34, the bevel and polishing thereof results in at least a portion of the transmitted light being internally reflected within the plate 26. This operates to further fill the plate 26 with light and provide even illumination of the plate 26.

Formed in one or both of the first and second surfaces 28, 30 are indicia 40 representative of the necessary markings associated with the particular type of display 14, 16, 18. The indicia 40 may be cut, etched, molded or otherwise formed in the surface 28, 30. Upon illumination of the plate 26 by the light source 38, the slightly rough surface of the indicia 40 will pick up the light and be illuminated or glow, as will the outer peripheral edge 34.

The light source 38 may be any one of a variety of light sources including, without limitation, light emitting diodes (LED's), LED arrays, incandescent bulbs, fluorescent bulbs, electroluminescent sheet material and electroluminescent wire. Each of these types of light sources 38 may be interchangeably utilized as generally indicated elsewhere in this specification.

Figure 3:
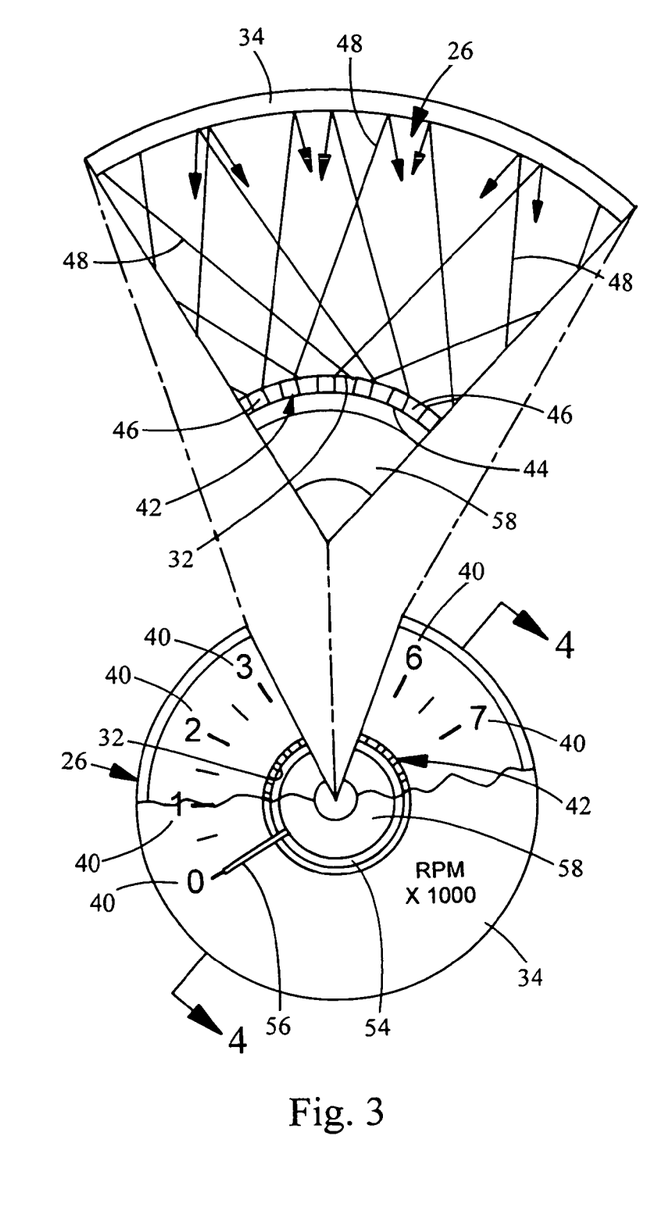
FIG. 3 is a split diagrammatic view of a display according to the principles of the present invention.

As seen in FIGS. 2 and 3, a LED array 42 is located adjacent to the inner peripheral edge 32. Preferably, the LED array 42 is attached to a flexible circuit board 44 and located immediately adjacent to the inner peripheral edge 32. If desired, organic LED's can be used to allow for a variable color mode in the display 14, 16, 18.

As mentioned above, light emitted from the individual LED's 46 of the LED array 42 fills the plate 26 with light, as represented by the crisscrossing lines of FIG. 3, several of which are designated at 48. Upon reaching the outer peripheral edge 34, at least a portion of the light is reflected back into the plate 26 to fill the plate 26 with light. The rough surfaces of the indicia 40 pick up the light and provide the indicia 40 with a glowing appearance. Some of the light emitted by the LED array 42 may not be reflected by the outer peripheral edge 34 and, accordingly, the outer peripheral edge 34 may similarly be provided with a glowing appearance.

Figure 4:
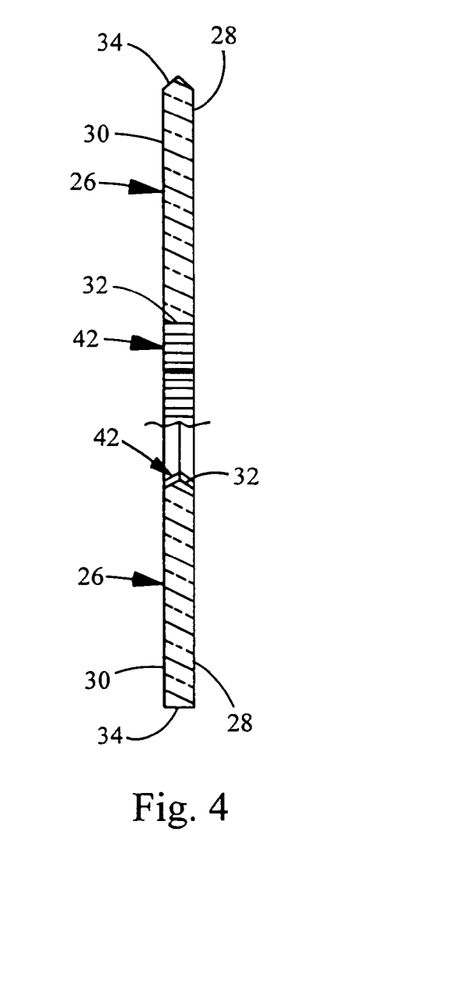
FIG. 4 is a sectional view taken generally along line 4—4 in FIG. 3.

In an alternative embodiment seen in the lower half of FIGS. 3 and 4, the outer peripheral edge 34 is illustrated as being formed generally perpendicular to the first and second surfaces 28, 30 so as to eliminate the glowing appearance of that edge. As a further and separate alternative, the inner peripheral edge 32 is differently illustrated in the lower portions of FIGS. 3 and 4. As seen in the lower portions, the inner peripheral edge 32 is beveled with respect the first and second surfaces 28, 30. An alternative light source 38, such as an electroluminescent sheet material, is provided over the bevel to thereby emit light into the plate 30.

The light source 38 and the plate 26 are supported by a support member 52 extending into and/or through the aperture or the depression in the plate 26. The support member 52 defines or includes a housing 54. The support member 52 may alternatively extend in a direction rearward from and generally perpendicular to the plate 26, as illustrated in display 14 of FIG. 1 and shown in FIG. 2, so as to provide the display 14 with a floating appearance. Alternatively, as illustrated in connection with displays 16, 18, the support member 52 may extend in a direction generally parallel to the first and second surfaces 28, 30 and be connected to the base plate 22. Constructed in this manner, the support member 52 provides the display 16, 18 with a pedestal mounted appearance, as generally shown in phantom in FIG. 2. Obviously, the individual displays 14, 16, 18 of the instrument cluster 10 could each utilize either of the two described support members 52 in any combination thereof.

When the display 14, 16, 18 is an analog instrument, it is further provided with a movable pointer 56 connected to a motor, preferably a stepper motor, supported by the housing 54. The motor 58 is controlled such that the pointer 56 moves relative to the indicia 40 to accurately indicate the parameter being represented thereby. For aesthetic reasons, a pointer cover 60, having a slot 62 formed therein to permit a range of movement by the pointer 56, is mounted to the housing 54 on that side visible by the occupant of the vehicle.

Figure 5:
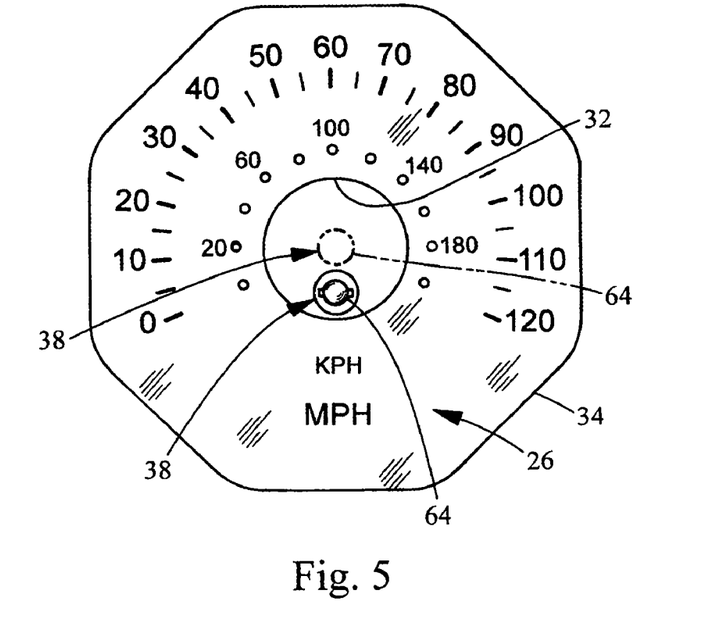
FIGS. 5 and 6 are plan views of additional embodiments embodying the principles of the present invention.

Referring now to FIGS. 5 and 6, illustrated therein are variations on features of the displays 14, 16, 18 described above. For clarity and convenience, various elements of the displays 14, 16, 18 have been omitted from these figures. As shown in FIG. 5, the light source 38 may be located either centrally with respect to the aperture defined by the inner peripheral edge 32 of the plate 26 or may be offset relative thereto. The light source 38 shown in FIG. 5 is illustrated as being an incandescent bulb 64. Additionally, the inner peripheral edge 32 and outer peripheral edge 34 may be provided in a desired shape other than round. Round displays 14, 16, 18 were previously illustrated in FIGS. 1—4. In the drawing of FIG. 5, the peripheral edges 32, 34 defines a polygonal (octagonal) shape to the plate 26.

Figures 7, 8:
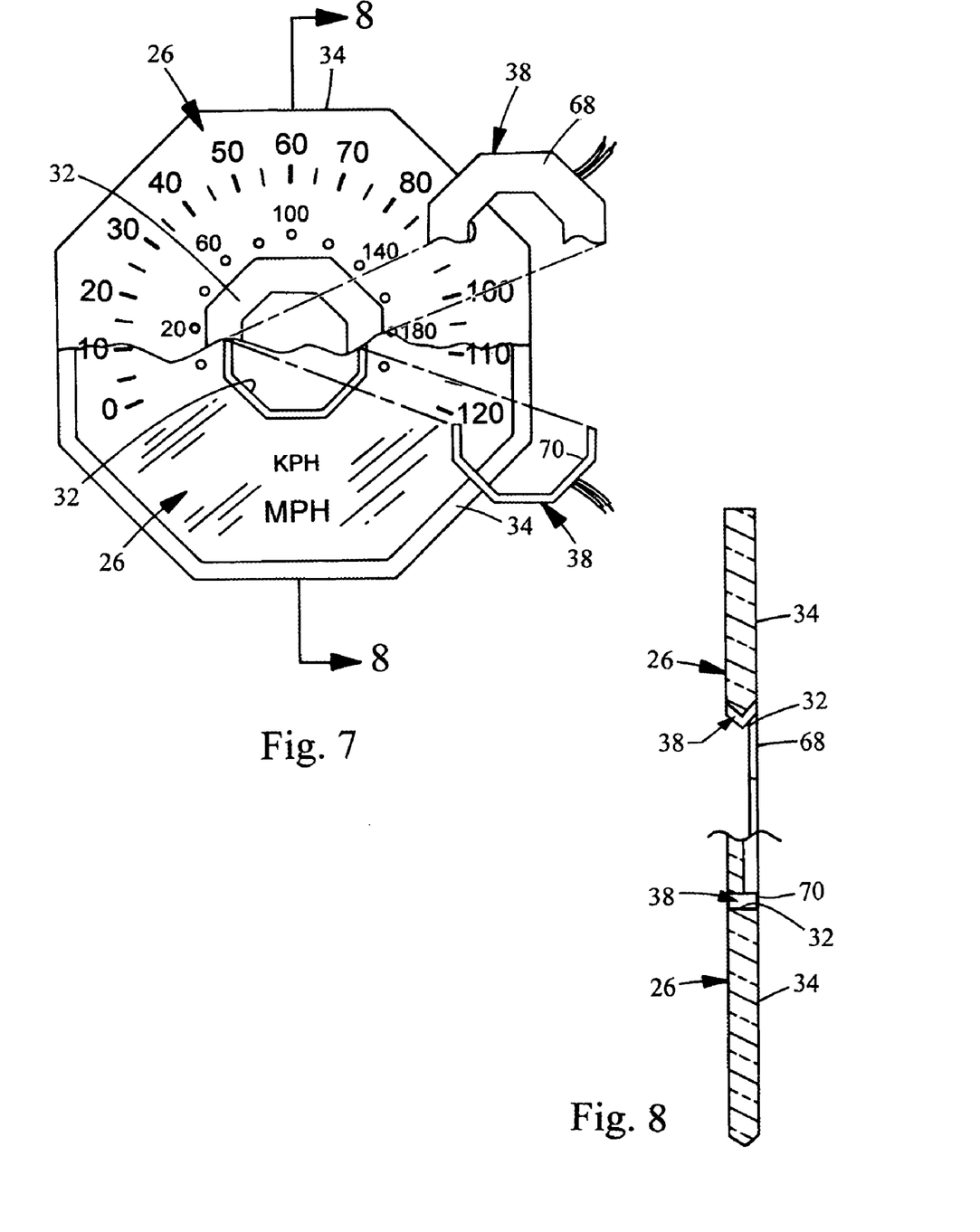
FIG. 7 is a split diagrammatic view of a display according to the principles of the present invention.
FIG. 8 is a sectional view taken generally along line 8—8 in FIG. 7.

As illustrated in FIG. 6, instead of the inner peripheral edge 32 defining an aperture extending completely through the plate 26, the inner peripheral edge 32 may be part of a depression 36 formed in the plate 26. Also shown in FIG. 6, the light source 38 is a curved fluorescent bulb 66. As seen in the split view of FIGS. 7 and 8, the light source 38 can alternatively be an electroluminescent sheet material 68 or an electroluminescent wire 70 applied to either the inner peripheral edge 32 or the outer peripheral edge 34, either of which may be a bevel or straight edge.

Figure 9A:
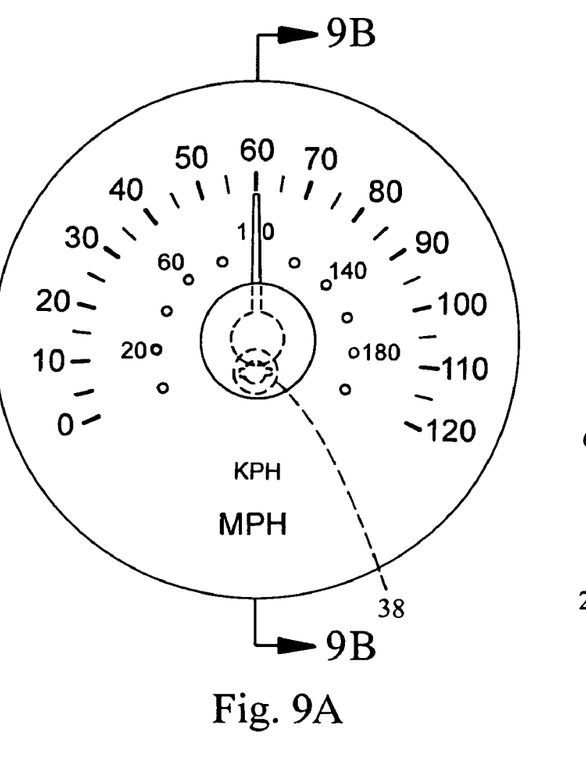
FIG. 9A is a plan view of a display according to another embodiment of the invention.
Figure 9B:
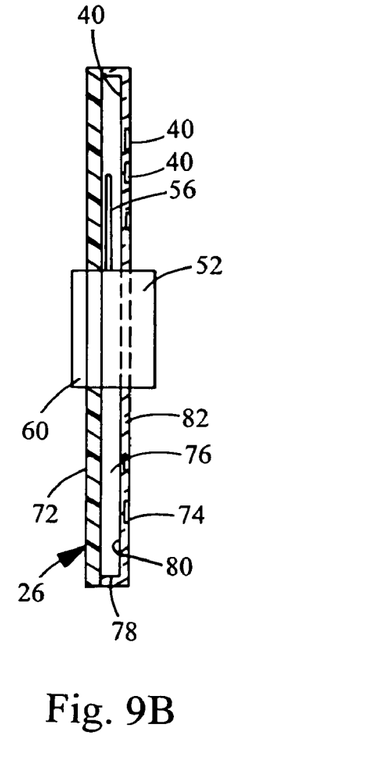
FIG. 9B is a sectional view taken along line 9B—9B in FIG. 9A.

In the alternative embodiment of FIGS. 9A and 9B, the display 14, 16, 18 is provided in the form of a pair of plates, a front plate 72 and a rear plate 74. The front and rear plates 72, 74 cooperate to define a cavity 76 therebetween and within which is located the pointer 56. The back plate 74, or alternatively the front plate 72, may be provide with a perimeter flange 78 such that the cavity 76 is fully enclosed. Indicia 40 may be formed on either of the opposing surfaces of the front plate 72 or the rear plate 74. As illustrated, the indicia 40 are shown on both the interior and exterior surfaces 80, 82 of the rear plate 74. It is additionally noted that the pointer 56 may be a lighted pointed similarly illuminated by the light source 38 or may be an unlit, silhouetted pointer. In the construction of FIGS. 9A and 9B, it is further noted that at least the plate bearing the indicia 40 is illuminated by the light source 38 and that both plates 72, 74 may be illuminated.

Figures 10A, 10B:
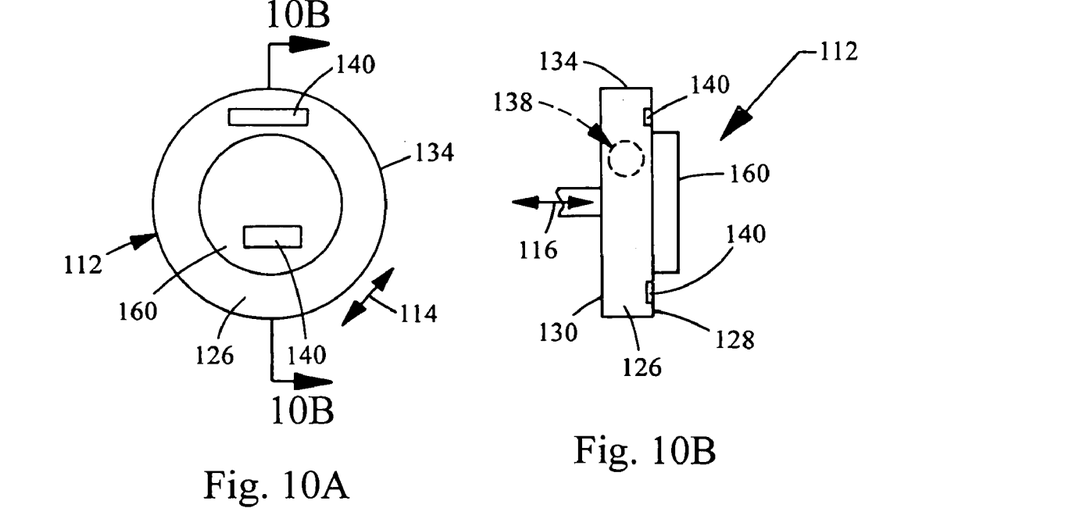
FIG. 10A is a plan view of a button or control embodying the principles of the present invention.
FIG. 10B is a sectional view taken along line 10B—10B in FIG. 10A.

Referring now to FIGS. 10A and 10B, the teachings of the present invention are applied to a control 112 as might be utilized for the interior environment of the automotive vehicle. The illustrated control 112 is represented as a push and/or turn button, those actions being represented by arrows 114 and 116. The control 112 includes a plate 126 defining first and second surfaces 128, 130. Indicia 140 are provided, in the manner described above, in one or more of the surfaces 128, 130. A light source 138 is embedded or otherwise provided within the plate 126 so as to transmit light within the plate towards an outer peripheral edge 134. Upon encountering the rough surfaces of the indicia 140, light emitted by the light source 138 will cause the indicia 140 to be illuminated or glow. If desired, a cover 160 may be applied to the plate 126 so that when viewed from the interior of the automotive vehicle, a outer portion of the control 112 is illuminated and contrasted by the unilluminated cover 160. Obviously, a wide variety of button configurations could be provided through the incorporation of the teachings of the present invention.

Figure 11A:
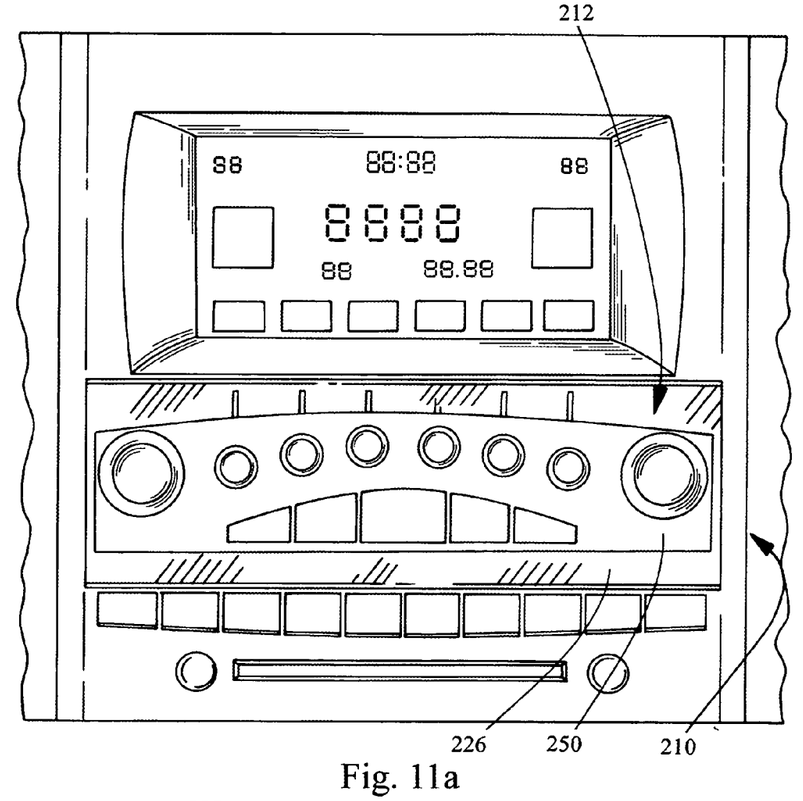
FIG. 11A is a plan view of an audio system incorporating a display in accordance with the principles of this invention.
Figure 11B:
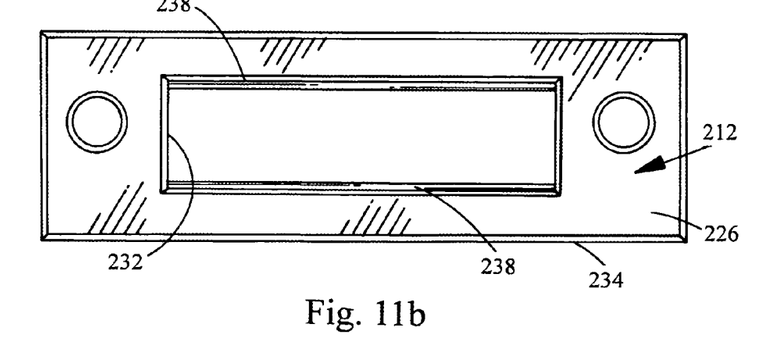
FIG. 11B is a plan view of a part of the display seen in FIG. 11A.

As seen in FIGS. 11A and 11B, teachings of the present invention are applied to another environmental control system, specifically the audio system 210 of the automotive vehicle. The audio system 210 is provided with the controls typically associated therewith including knobs or buttons which may or may not be of the variety described in connection with FIGS. 10A and 10B. Additionally, the audio system 210 is provided with a display face 212 incorporating the teachings of the present invention. The display face 212 includes a plate 226 of transparent or translucent material and including portions defining a inner peripheral edge 232 and an outer peripheral edge 234. Along at least a portion of the inner peripheral edge 232, a light source 238 is provided so as to illuminate the plate 226 in accordance with the teachings of the present invention. By forming indicia on part or all of the exposed surface of the plate 226, the display face 212 is made illuminated and contrasted relative to other features and elements of the audio system 210. As seen in FIG. 11A, a contrasting plate 250 is provided over the surface of the display face 226 for contrasting aesthetics.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention as defined in the following claims.

The invention claimed is:

1. An illuminable instrument panel display of an automobile vehicle, said display comprising:
    a first plate having a thickness and defining opposed first and second surfaces thereof, portions of said first plate defining an outer peripheral edge and an inner peripheral edge defining a central region;
    indicia formed into said first plate and adapted to pick up supplied light;
    a light source located within said central region and supported along said inner peripheral edge;
    a support coupled to said first plate so as to support said first plate relative to the instrument panel;
    said light source is configured to illuminate said indicia through the transmission of light through said inner peripheral edge within said thickness of said first plate.

2. The display of claim 1 wherein said light source is an LED.

3. The display of claim 1 wherein said light source is an LED array.

4. The display of claim 3 wherein said LED array is a circular array.

5. The display of claim 1 wherein said indicia is formed into one of said first and second surfaces.

6. The display of claim 1 wherein said indicia are etchings.

7. The display of claim 1 wherein said outer peripheral edge is internally reflective.

8. The display of claim 1 wherein said outer peripheral edge is beveled.

9. The display of claim 1 wherein said first plate is transparent or translucent.

10. The display of claim 1 wherein said first plate is glass or plastic.

11. The display of claim 1 wherein said first and second surfaces are supported by said support so as to be spaced from any adjacent surfaces of the instrument panel.

12. The display of claim 1 wherein said support includes a housing located at the center of said first plate.

13. The display of claim 12 wherein said support extends generally perpendicularly with respect to a plane defined by said first plate.

14. The display of claim 12 wherein said support extends generally parallel with respect to a plane defined by said first plate.

15. The display of claim 12 wherein said housing encloses a stepper motor.

16. The display of claim 15 wherein said stepper motor is coupled to a pointer, said pointer being moveably positioned adjacent to said first face.

17. The display of claim 1 wherein said display is at least one selected from the group consisting of a fuel gage, an oil pressure gage, an engine temperature gage, a speedometer, a tachometer, an audio face plate and a knob.

18. The display of claim 1 wherein said support includes a housing located centrally with respect to said first plate.

19. The display of claim 1 wherein said first plate and indicia define a gage plate.

20. The display of claim 1 wherein said light source is an incandescent bulb.

21. The display of claim 1 wherein said light source is a florescent bulb.

22. The display of claim 1 wherein said light source is an electroluminescent sheet material or an electroluminescent wire.

23. The display of claim 22 wherein said inner peripheral edge is beveled and said sheet material or wire is applied over said inner peripheral edge.

24. The display of claim 1 wherein said light source is offset in said central region with respect to said inner peripheral edge.

25. The display of claim 1 further comprising a second plate supported by said support, said second plate corresponding in size and shape to said first plate, said first and second plates cooperating to define a cavity therebetween, a pointer moveably supported within said cavity and cooperatively associated with said indicia.

* * * * *